Dec. 1, 1925.

W. H. McCLELLAND

STRIPPER

Filed Dec. 15, 1924

Inventor:
William H. McClelland
By Percy H. Moore.
Atty.

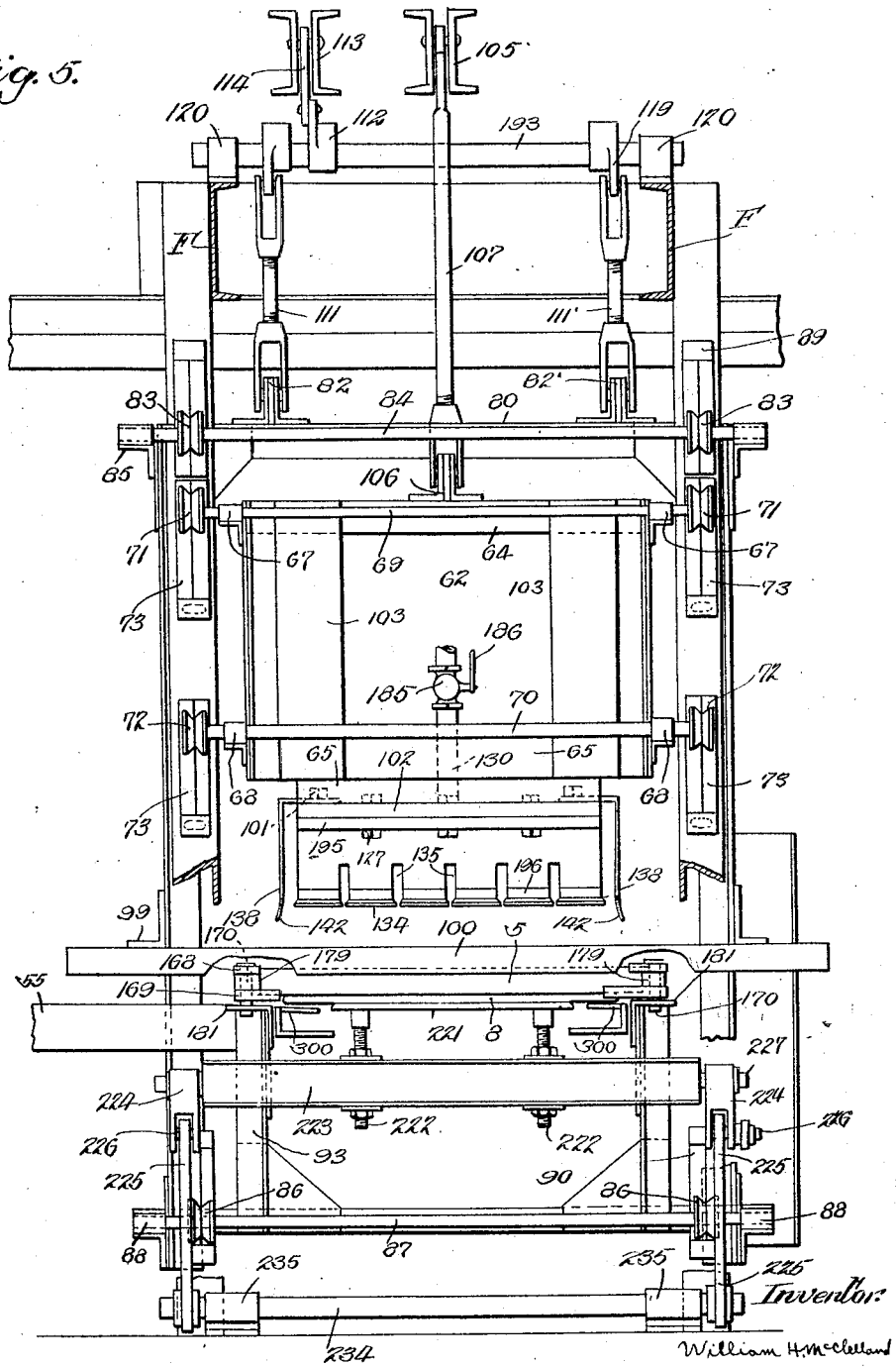

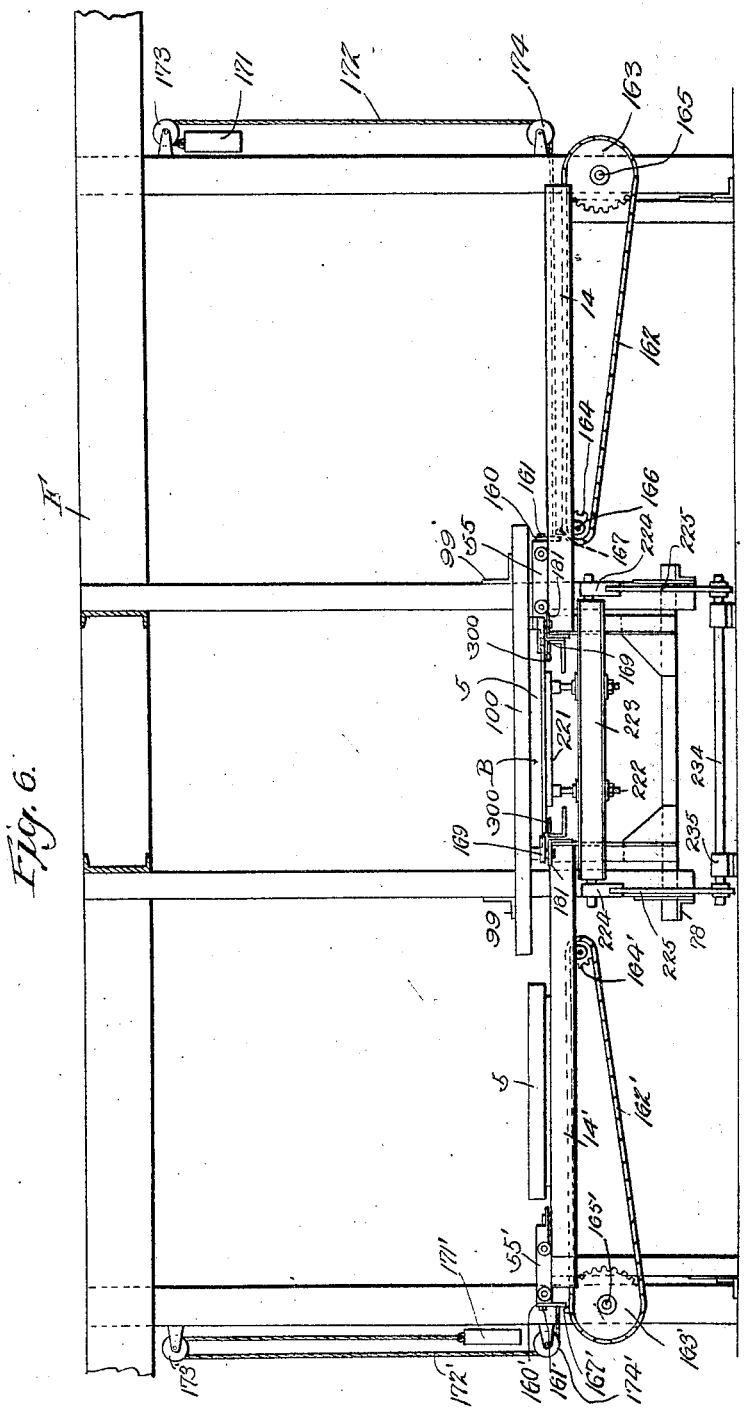

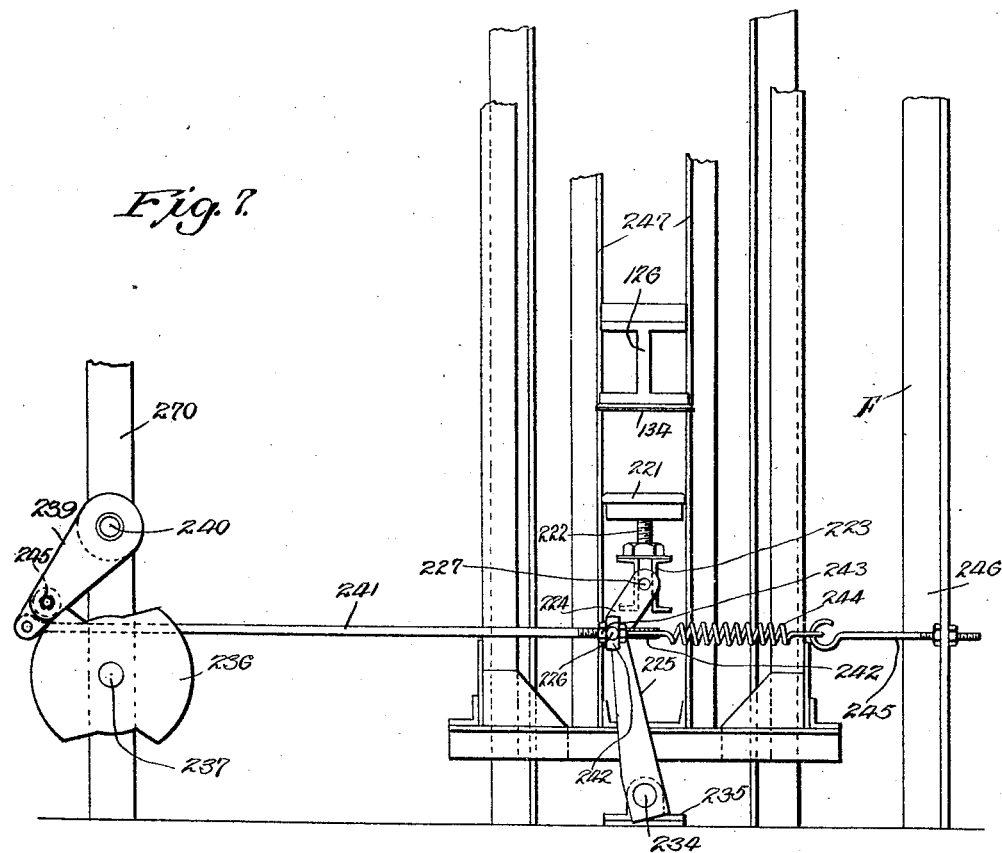
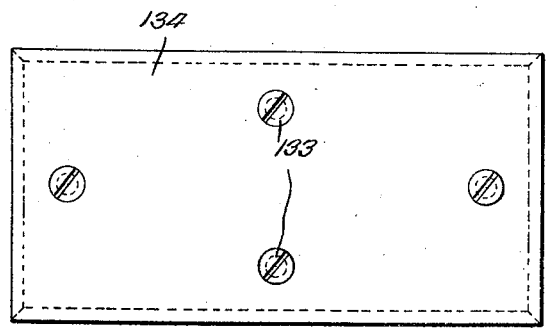

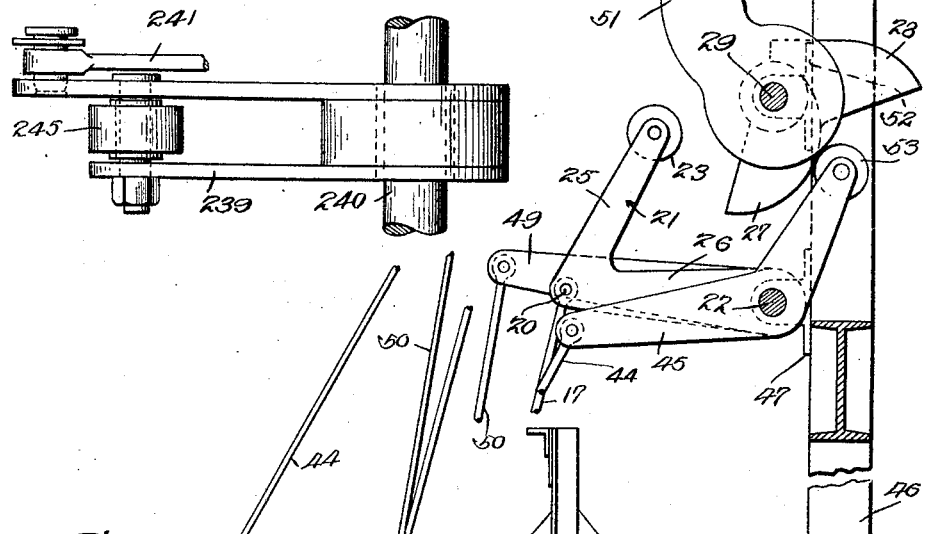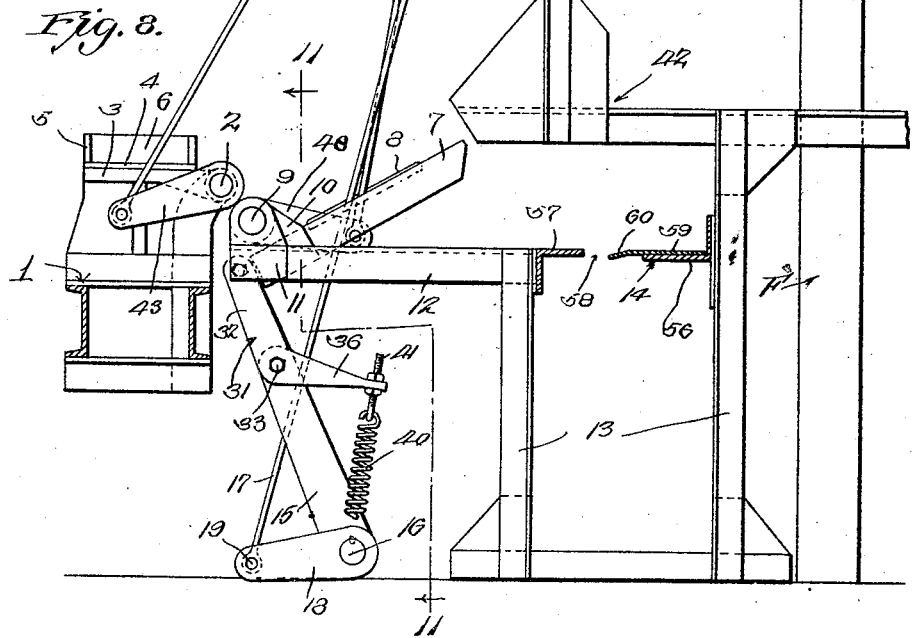

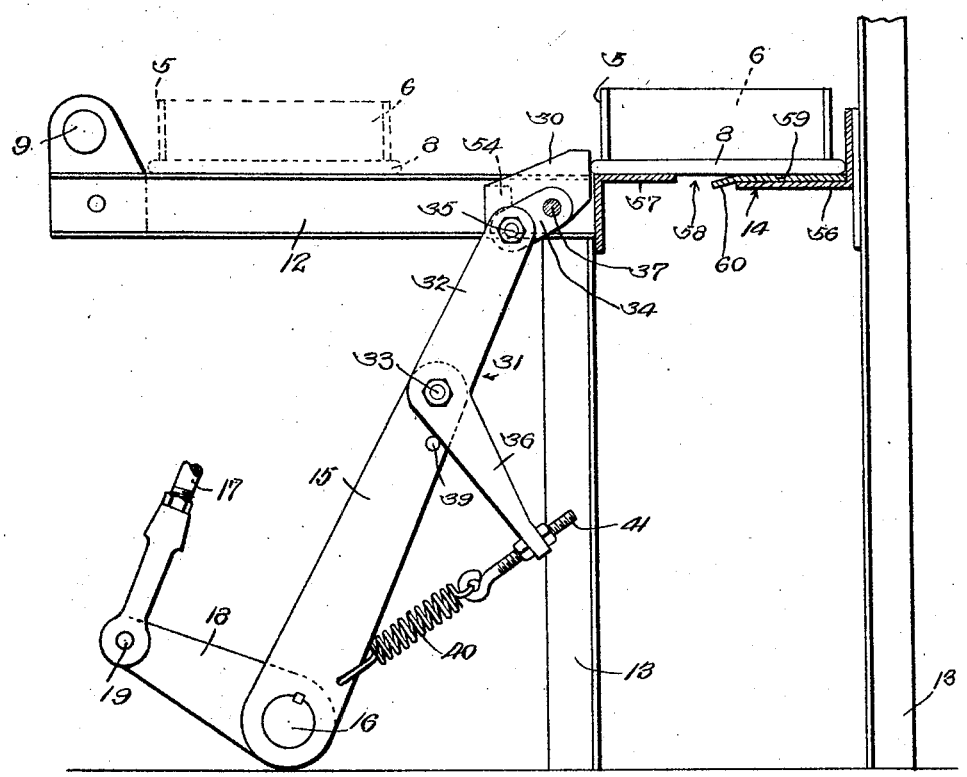
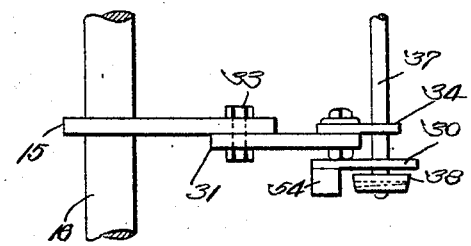

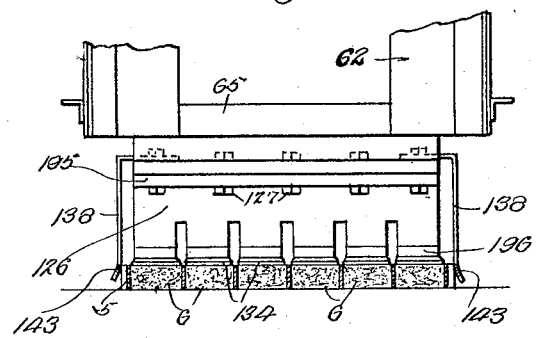
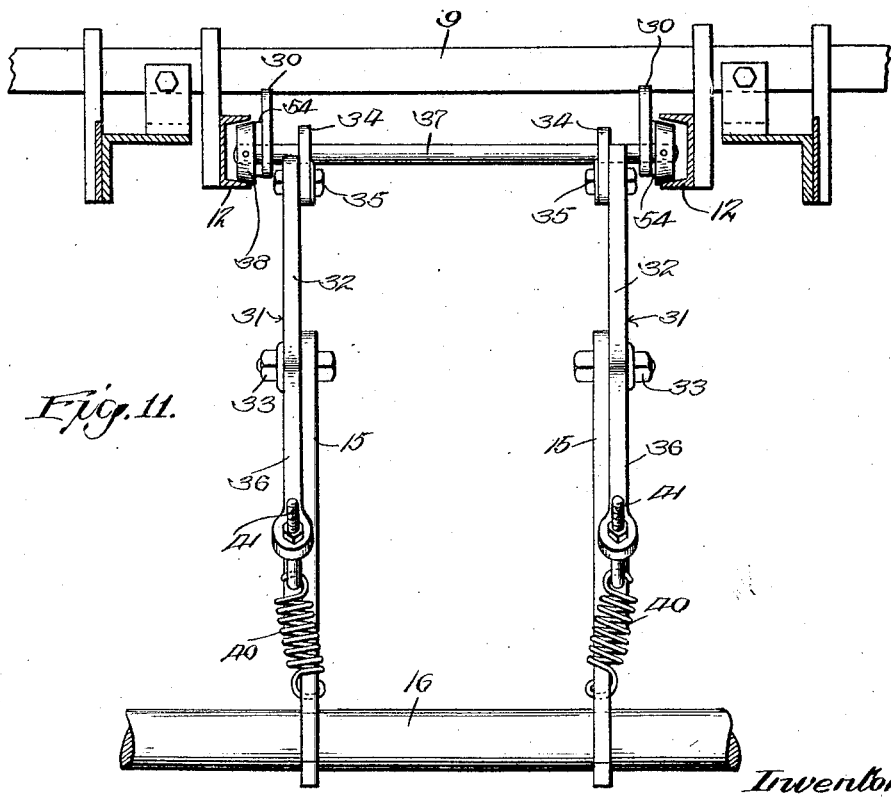

Dec. 1, 1925.
W. H. McCLELLAND
STRIPPER
Filed Dec. 15, 1924
1,563,423
20 Sheets-Sheet 11
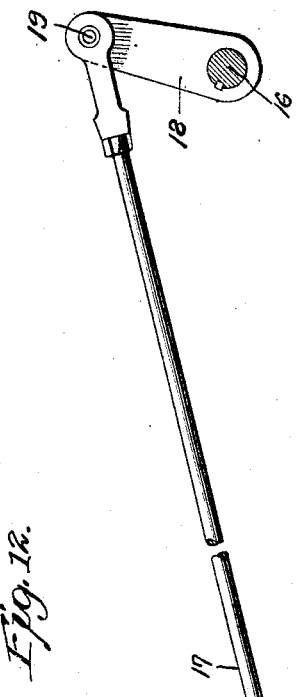
Fig. 12.
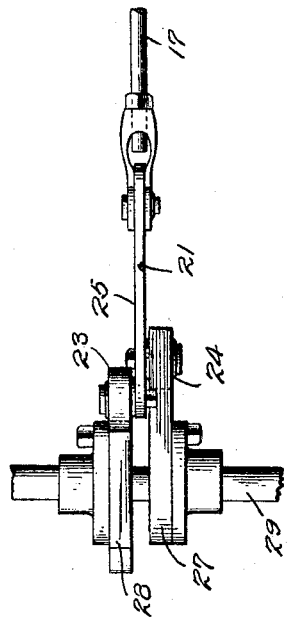
Fig. 13.
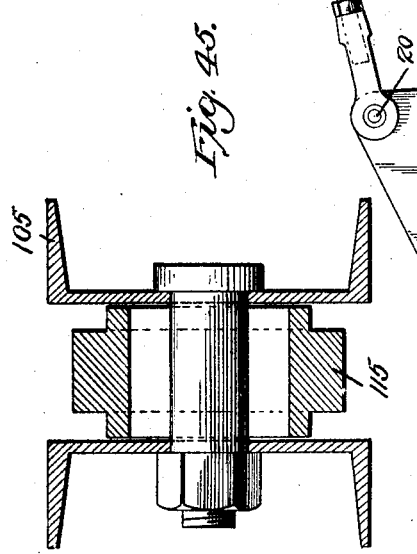
Fig. 45.
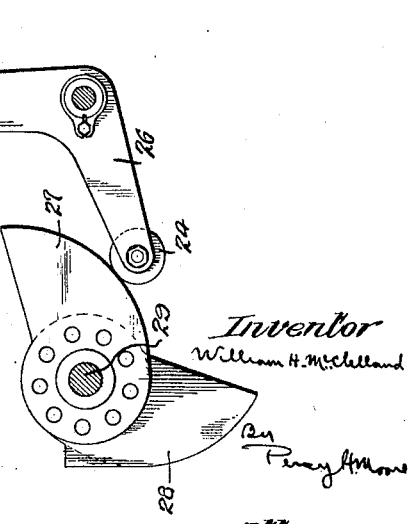
Inventor
William H. McClelland
By Percy H. Moore
Atty.

Dec. 1, 1925.
W. H. McCLELLAND
STRIPPER
Filed Dec. 15, 1924
1,563,423
20 Sheets-Sheet 12
Fig. 14.
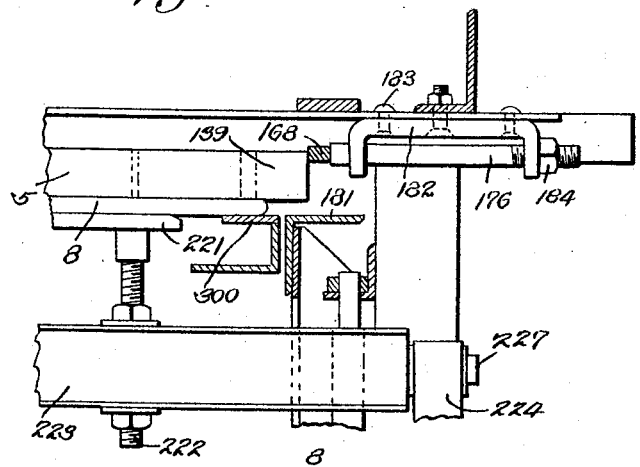
Fig. 15.
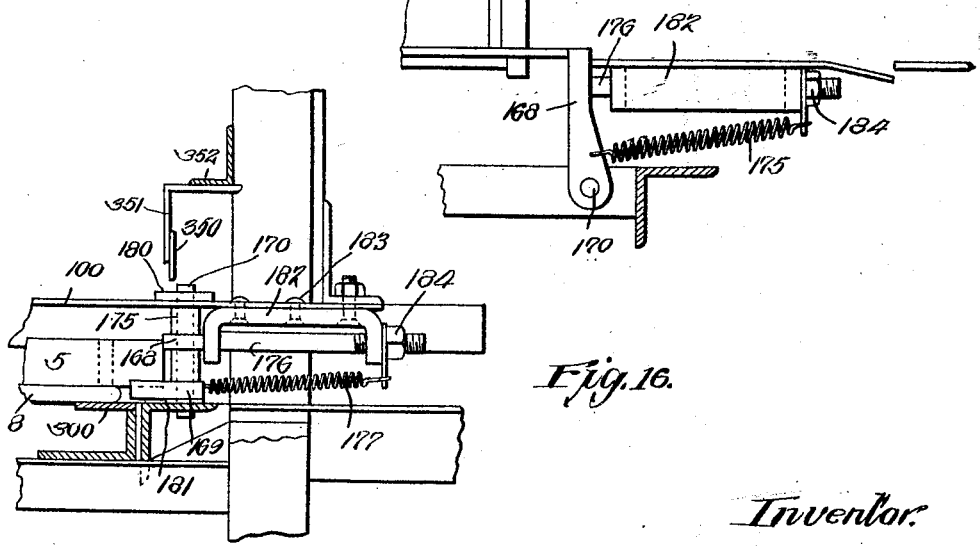
Fig. 16.
Inventor.
William H. McClelland
By Percy H. Moore
Atty.

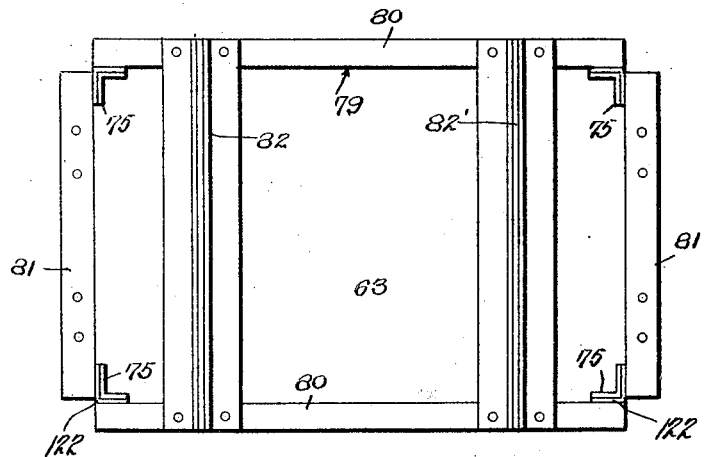
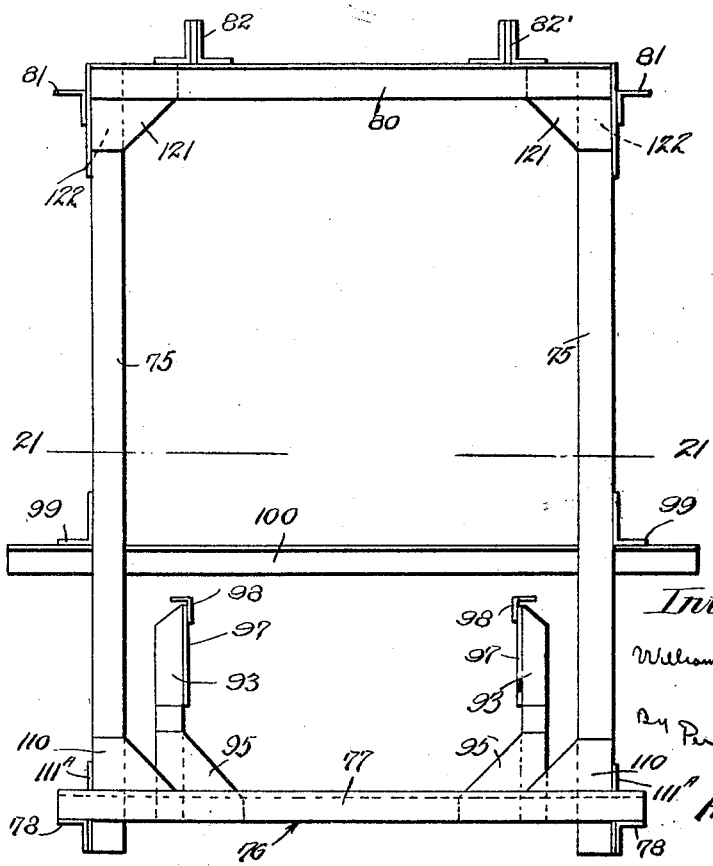

Dec. 1, 1925.

W. H. McCLELLAND

STRIPPER

Filed Dec. 15, 1924

Inventor:
William H. McClelland
By Percy H. Moore
Atty.

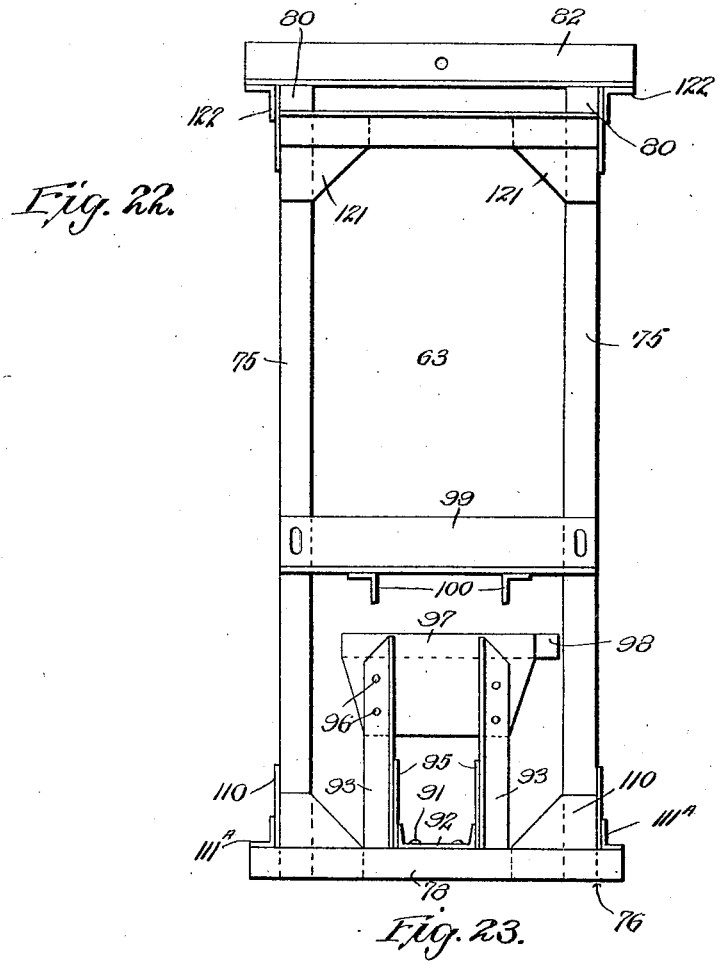
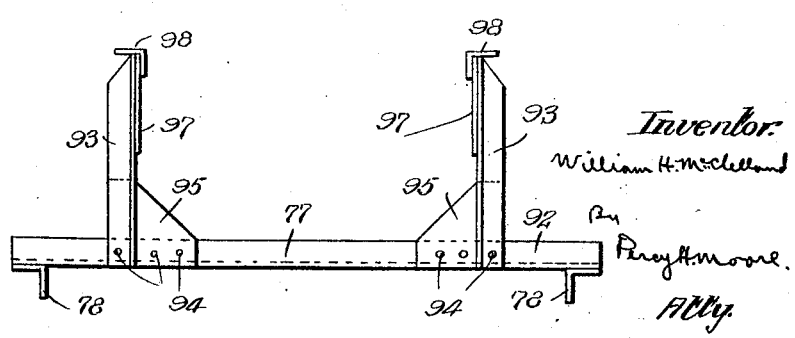

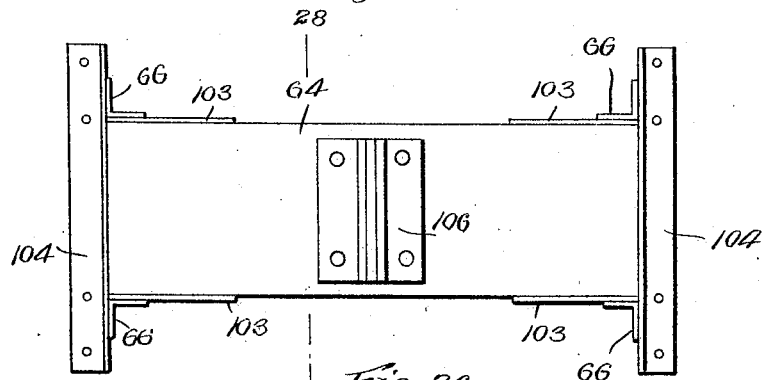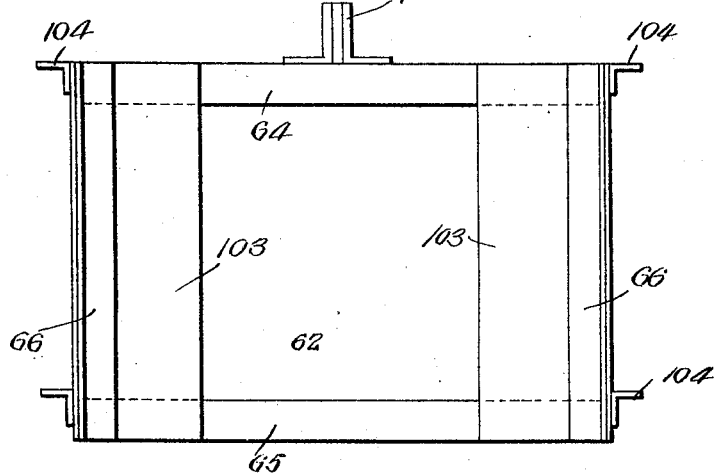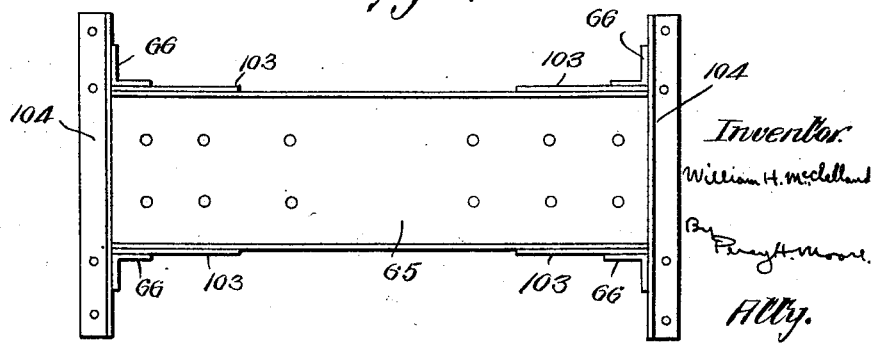

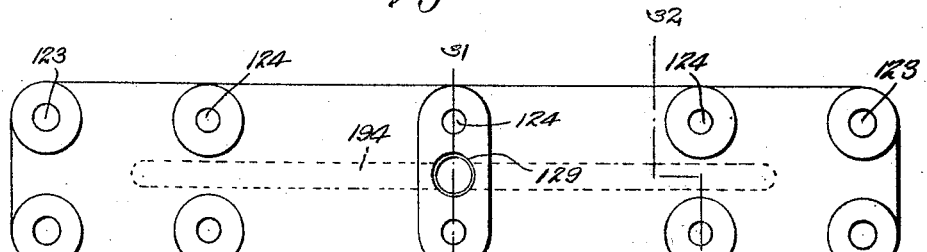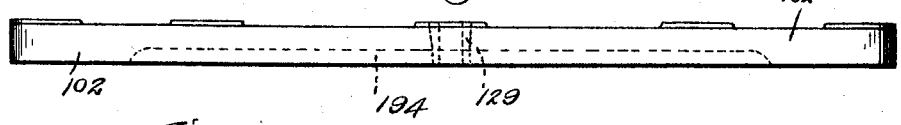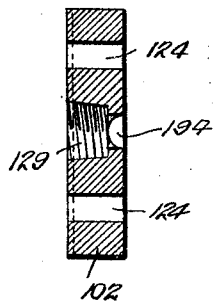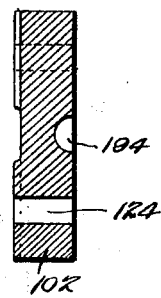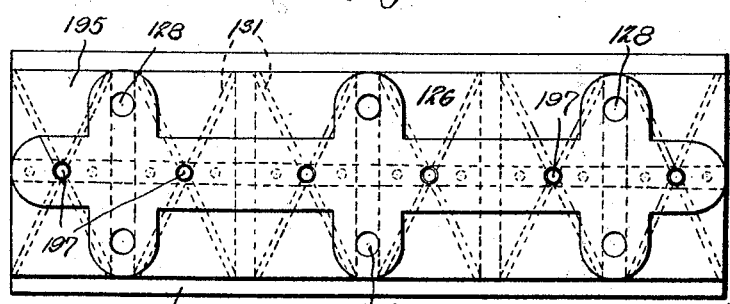

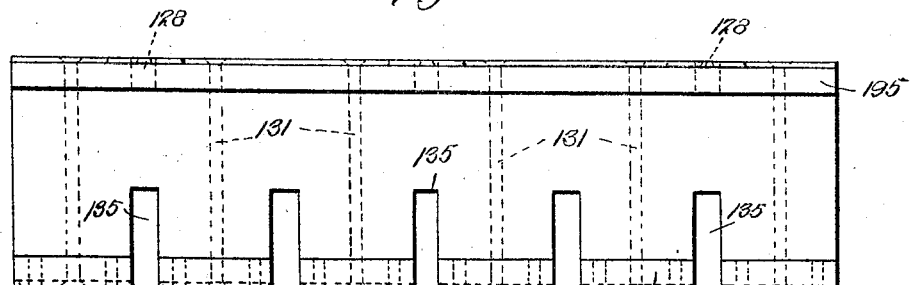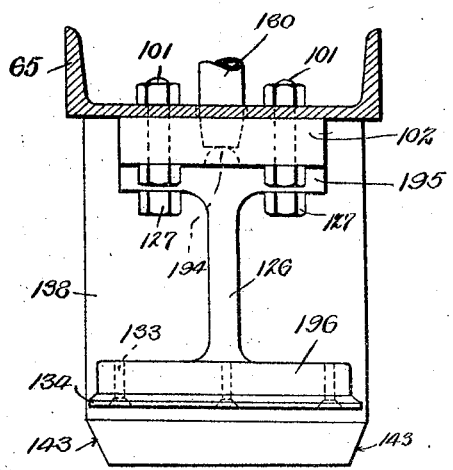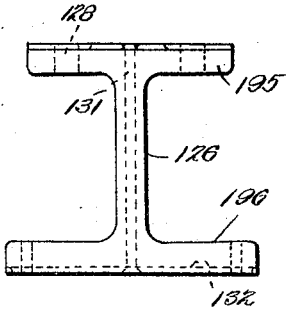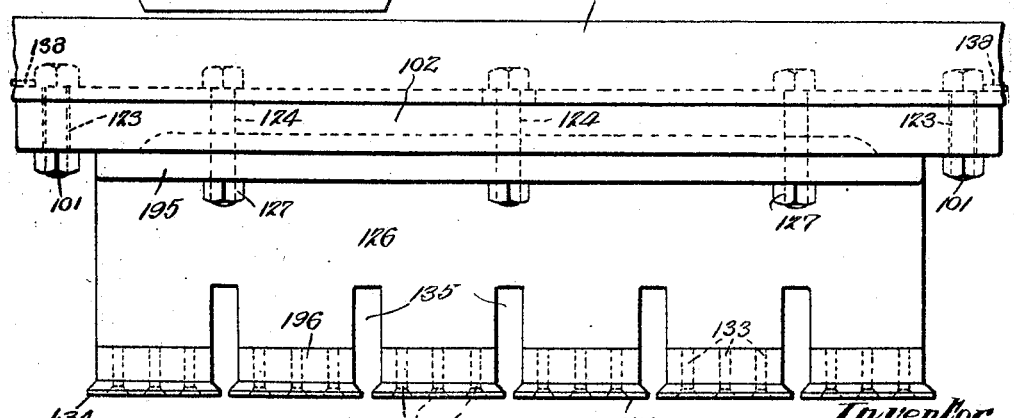

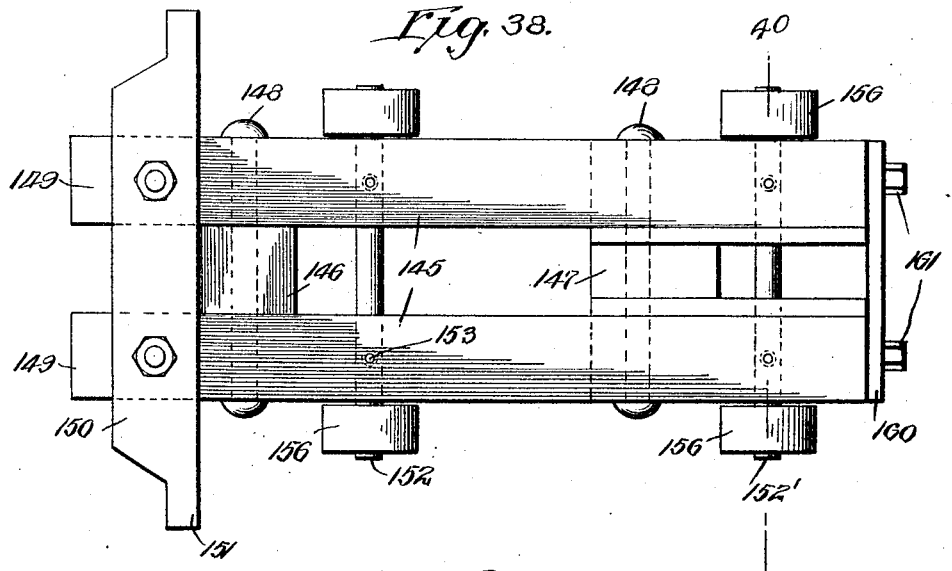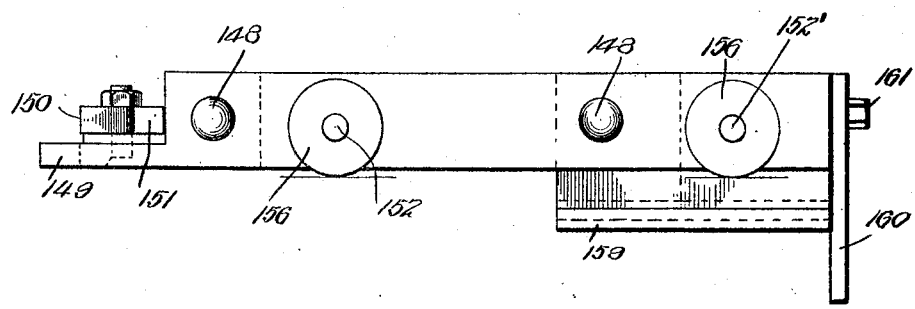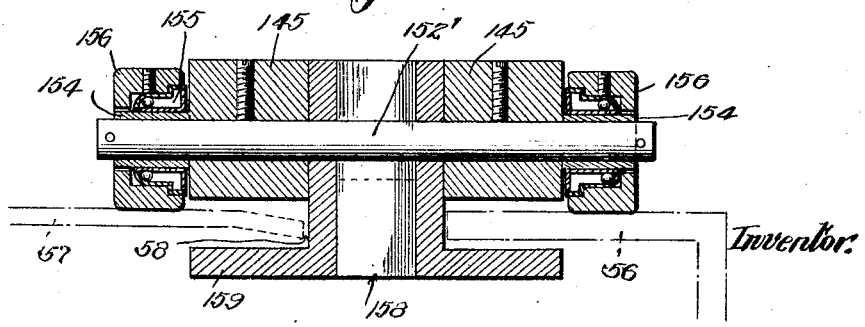

Patented Dec. 1, 1925.

1,563,423

UNITED STATES PATENT OFFICE.

WILLIAM H. McCLELLAND, OF MOUNT UNION, PENNSYLVANIA, ASSIGNOR, BY MESNE ASSIGNMENTS, TO ROY P. M. DAVIS, OF MOUNT UNION, PENNSYLVANIA.

STRIPPER.

Application filed December 15, 1924. Serial No. 755,939.

*To all whom it may concern:*

Be it known that WILLIAM H. McCLELLAND, a citizen of the United States of America, residing at Mount Union, in the county of Huntingdon and State of Pennsylvania, has invented certain new and useful Improvements in Strippers, of which the following is a specification.

My invention relates to brick making machines and more particularly machines for making silica brick.

The principal object of the invention is to provide means for stripping the mold from the molded brick.

A further object of the invention is to provide novel means for moving the loaded brick molds into the stripping mechanism.

Other and further objects and advantages of the invention will be apparent from the following description when considered in connection with the accompanying drawings, wherein:

Figure 5 is an enlarged fragmentary end elevation of the invention;

Figure 6 is a fragmentary side elevation of the transfer track showing the transfer carriage thereon;

Figure 7 is a detail view of the pedestal and means for operating the same;

Figure 8 is a detail view of the mechanism for moving the mold from the advance track to the transfer track;

Figure 9 is a view similar to Figure 8, showing the pallet with loaded mold thereon after being moved from the advance track to the transfer track.

Figure 10 is a detail view of the push board cage and mold;

Figure 11 is a section on the line 11—11 of Figure 8;

Figure 12 is a detail view in part of the mechanism for moving the loaded mold and pallet from the advance track to the transfer track.

Figure 13 is a fragmentary plan view of a portion of the mechanism shown in Figure 12;

Figure 14 is a fragmentary section through the mold stops;

Figure 15 is a plan view of the mold stops;

Fig. 16 is a detail side elevation of the mold and pallet stops;

Figure 19 is a plan view of the mold lift cage;

Fig. 20 is a side elevation of the mold lift cage;

Figure 22 is an end view of the mold lift cage;

Figure 23 is a detail view of a portion of the mold lift cage;

Figure 25 is top plan of the push board cage;

Figure 26 is a side elevation of the push board cage;

Figure 27 is a bottom plan of the push board cage;

Figure 29 is a plan of the push board head;

Figure 30 is a side elevation of the push board head;

Figure 31 is a section on the line 31—31 of Figure 29;

Figure 32 is a section on the line 32—32 of Figure 29;

Figure 33 is a top plan of the push board;

Figure 34 is a side elevation of the push board;

Figure 35 is an end view showing the push board, the push board head and the push board pad, assembled on the push board cage channel base member;

Figure 36 is an end view of the push board;

Figure 37 is a side elevation of the push board, push board pad and push board head assembled on the push board cage channel base member;

Figure 38 is a detail plan view of the transfer carriage;

Figure 39 is a side elevation of the transfer carriage;

Figure 40 is a section on the line 40—40 of Figure 38;

Figure 41 is a bottom plan of the push board pad;

Figure 42 is a detail view of one of the U-shaped tracks on which the rollers on the push board cage operate;

Figure 43 is a detail plan of the crank arms for actuating the pedestal;

Figure 44 is a detail plan of the mechanism for moving the mold and pallet from the advance to the transfer track and Figure 45 is a detail section on the line 45—45 of Figure 1.

Figure 1:
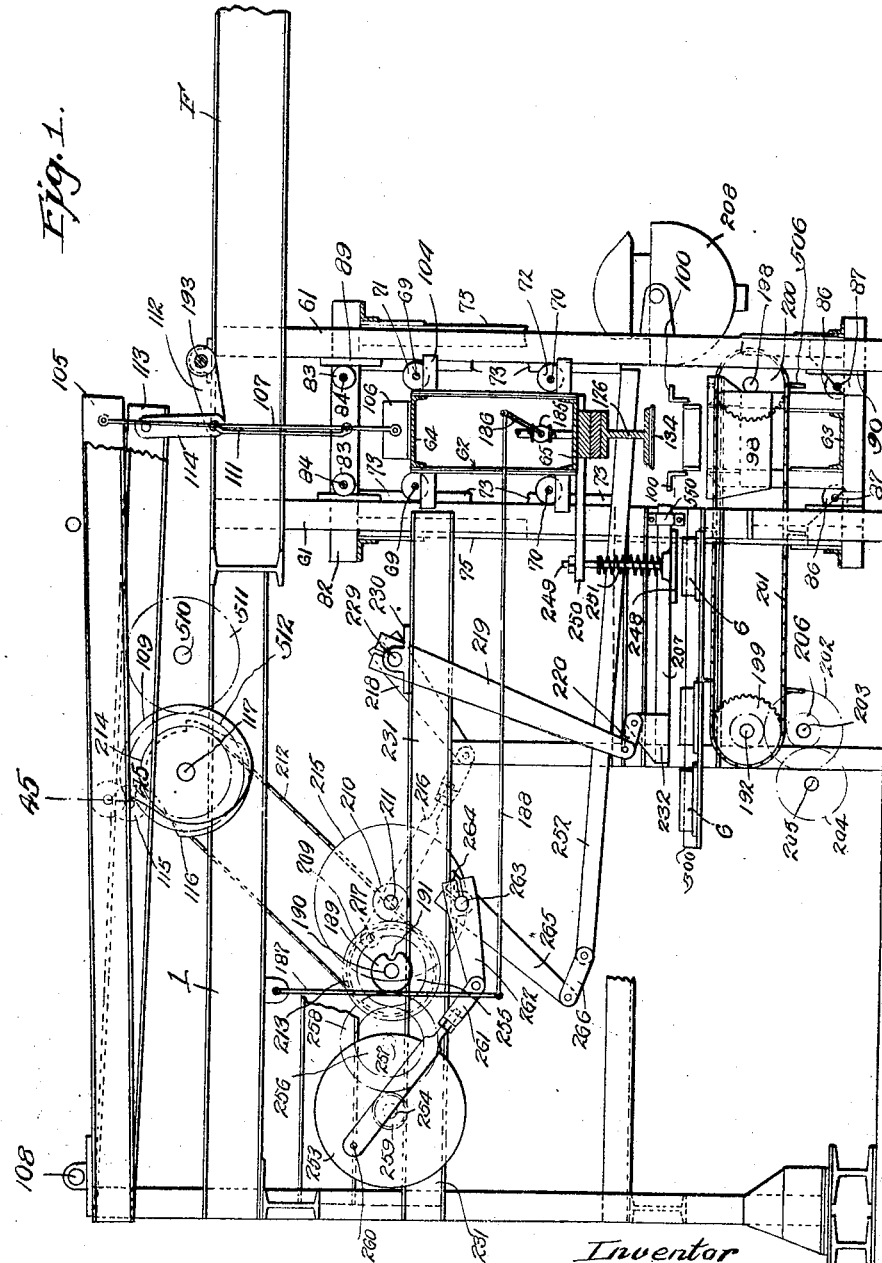
Figure 1 is a side elevation partly in section of the invention.

Referring more particularly to the drawings wherein like reference numerals denote corresponding parts throughout the several views, 1 designates a part of a brick making machine in which a horizontally disposed shaft 2, is rotatably supported. Secured to this shaft 2, are mold supporting arms 3, which have a plate 4, suitably secured thereto. The skeleton mold 5, with the molded brick 6, therein (see Figure 8) previously slicked by any suitable means (not shown) rests upon the plate 4, of mold supporting arms 3, in position to be delivered to the pallet arms 7. When delivered to the pallet arms 7, more fully illustrated in my co-pending application Serial No. 755,937, filed December 15, 1924, the mold 5 and brick 6, will rest upon the pallet 8, previously delivered to the pallet arms.

The pallets 8, are delivered to the pallet arms 7, from the pallet delivery station 42, by any suitable means (not shown).

The pallet arms 7, are fixed to a horizontal shaft 9, by means of brackets 10, the shaft 9, being supported by brackets 11, secured to the inner face of two pair of channel beam skid rails or advance tracks 12 and 12'. These advance tracks which project forwardly from and are supported by the uprights 13 and 13' of the stripper, are positioned at opposite ends of the machine.

Movement of the mold supporting arms 3, and the pallet arms 7, toward each other to transfer the loaded mold to the pallet arms, and away from each other to return the arms to their original horizontal position is effected as follows: Secured to the shaft 2, is a crank arm 43, connected by a rod 44, to a bell crank 45, fixed to a horizontal shaft 22. This shaft 22, is supported from one of the uprights 46, of the main frame F, of the machine, by means of a bracket 47, and acts as a fulcrum for bell crank 45. A crank arm 48, on the shaft 9, is connected to a crank arm 49, on the shaft 22, by means of a connecting rod 50. The crank arms 45 and 49 are simultaneously actuated by a cam 51, on a shaft 29, suitably supported from the frame F, as by means of the bracket 52, and constantly driven from any suitable source of power (not shown). This cam 51, engages a roller 53, on the free arm of the bell crank 45, at each revolution of the shaft 29, thus causing the mold supporting arms and the pallet arms 7, to alternately approach and move away from each other in an obvious manner.

When the arms 7, return to horizontal position and slightly below the top edge of the skid rails 12—12' after a filled mold 5, has been deposited upon the pallet, the pallet 8, with inverted molds thereon will be caused to rest upon the advance tracks or skid rails as shown in dotted lines in Figures 3 and 9, it being understood that the operation is the same at each end of the machine. From this position (Figure 3 dotted line position) the mold and pallet are pushed along the skid rails 12—12', and also finally deposited upon the transfer table 14—14', also supported from the stripper frame uprights 13—13'. This is accomplished by means of two pair of pusher arms 15, (one pair for each pair of advance tracks) keyed to a horizontal shaft 16.

A connecting rod 17, is pivotally connected at its lower end to a crank 18, on the shaft 16, as at 19, and at its upper end is pivotally connected as at 20, to a U-shaped lever 21, mounted on the horizontally disposed shaft 22. The rollers 23 and 24 on the arms 25 and 26 of the lever 21, are alternately engaged by cams 27 and 28 on the shaft 29, constantly driven from any suitable source of power (not shown), thus causing the pusher arms 15, to oscillate with the shaft 16. As the pusher arms 15, are oscillated to the right, Figures 8 and 9, the pusher fingers 30, mounted on the shaft 37, engage the pallet with loaded mold thereon and cause the pallet and mold to move in a corresponding direction toward the transfer table 14, it being understood that the rollers 38, on the ends of shaft 37, ride in the channel beam skid rails 12, during this movement.

Pivotally mounted on the upper extremities of the pusher arms 15, as at 33, are bell cranks 31. The pusher fingers 30, previously mentioned are operatively connected to the arms 32, of the bell cranks 31, by means of links 34, depending from the shaft 37, and pivoted to the arms 32 as at 35. The projections 54, on the pusher fingers fit in between the flanges of the skid rails and together with the rollers serve to guide the pusher fingers along the skid rails 12. The arms 36, of the bell cranks 31, are held against a stop pin 39, by means of spring 40, and adjusting bolt 41, during this movement. This bell crank and spring arrangement provides for the necessary flexibility where the widths of molds or pallets vary or where the pusher arms are inadvertently caused to overtravel.

The operation just described brings the pallet and mold thereon into Figure 9 position upon the transfer table 14, in advance of a pusher carriage 55, from which position they are advanced to and rest upon the ledges 300, of the stripper mechanism by means of the pusher carriages 55—55', hereinafter more specifically described. The transfer tables 14—14' which are suitably supported from the uprights 13—13' of the frame comprise two horizontal angle members 56 and 57, having a longitudinally disposed slot or opening 58, therebetween, the purpose of which will be presently described. Suitably secured to and resting upon the angle member 56, is a plate 59, having a downwardly bent edge or lip 60, which projects into the opening or slot 58. The purpose of this downwardly bent edge or lip 60, is to prevent the edge of the pallet 4, from dropping down into the slot 58, when the pallet is being moved from the dotted line position to full line position Figure 9. As the construction of the two transfer tables and the two pair of advance tracks at each end of the machine are identical, a detailed showing and description of both ends is deemed unnecessary.

The stripper frame comprises the uprights 61, suitably secured in the frame F of the machine. Mounted in the uprights 61, for vertical movement are what may be termed the push board cage 62, and the mold lift cage 63. The push board cage 62, is composed of top channel members 64, bottom channel members 65, and four corner posts 66. Vertically disposed brace plates 103, and horizontally disposed angle braces 104, serve to brace and add rigidly to the construction of the push board cage. The ends of the angle braces 104, project slightly beyond the sides of the top and bottom channel members 64 and 65, and also beyond the side edges of the corner posts 66. Mounted in bearings 67 and 68 secured to each side of the push board cage 62, adjacent the top and bottom thereof and supported upon the extended ends of the angle braces 104, are upper and lower shafts 69 and 70 respectively, on the respective ends of which are mounted grooved rollers 71 and 72. These grooved rollers engage and travel upon the guide members 73, suitably secured to the uprights 61, and prevent lateral movement of the cage. The movement of the cage 62, is effected by means of a walking beam 105, pivotally connected to the bracket 106, on the cage 62, by means of a connecting rod 107. The walking beam 105, which is pivoted to the frame F as at 108, is actuated by a cam 109, on the cam shaft 117, which cam engages the roller 115 carried by the walking beam, as will be more fully described hereinafter.

The mold lift cage 63, is composed of four angle corner posts or uprights 75, secured at their lower ends to a rectangular base 76, comprising side and end beams 77 and 78 respectively, corner braces 110 and angle braces 111$^A$ being employed to brace and to make the structure rigid. The upper ends of the corner posts are secured to a top rectangular frame 79, comprising side and end bars 80 and 81 respectively braced by corner plates 121 and angles 122. A pair of brace or bracket members 82 and 82' connect the side bars 80 and serve as a means of connecting the mold lift cage to the walking beam. A connecting rod 111, is pivoted at its lower end to the brace or bracket 82, and at its upper end to a crank arm 112, mounted on a shaft 193, in turn supported in bearings 120, mounted in the frame F. The crank arm 112, is pivotally connected to a walking beam 113, by means of a link 114, the walking beam 113, being pivotally supported on frame F as at 108 at one end and having a roller 115, intermediate its ends which is engaged by the cam 116, on shaft 117. A second connecting rod 111' is pivoted at its lower end to the brace or bracket 82' and at its upper end is pivoted to a crank arm 119, on the shaft 193. Rotation of the cam shaft 117, in a manner hereinafter described causes the push board cage and the mold lift cage respectively to be elevated and lowered at predetermined intervals.

Upper grooved rollers 83, mounted on upper shafts 84, journaled in brackets 85, at each side of the top of the mold lift cage, and lower grooved rollers 86, mounted on shafts 87, journaled in brackets 78, at each side of the bottom of the mold lift cage, serve to prevent lateral movement of the mold lift cage when the latter is raised and lowered. These rollers engage guides 89 and 90, secured to the uprights 61, of the stripper frame.

Extending between the end members or bars 78, of the base 76, of the mold lift cage and secured thereto by bolts or rivets 91, is a U-shaped channel member 92, to which are secured four angle beams or uprights 93, by means of bolts or the like 94, brace plates 95, being employed to give rigidity. Secured to each end pair of uprights 93, as by bolts 96, is a plate 97. Secured to the plates 97, are angle iron mold lift members or rails 98, and secured to braces 99, extending between the corner uprights 75, of the mold lift cage, are a pair of angle iron guides 100, the purpose of which is to guide the mold from the transfer table to the pallet and mold ledges or rests 300, as will be explained more in detail hereinafter.

Secured to the bottom channel member 65, of the push board cage, by means of bolts 101 (see Figure 35) is the push board head or casting 102, shown in detail in Figures 29 and 30, the head being drilled at 123, for the reception of the bolts 101. Holes 124, are also drilled in the head 102, to facilitate attaching the I-shaped push board 126, to the head 102, bolts or like fastening means 127, which pass through openings 128, in the top flange of the push board, and through the openings 124, in the head being employed for this purpose. The push board head is formed with a longitudinally disposed groove 194, in the under face thereof. Communicating with the groove 194, is a threaded bore 129, in which is seated an air pipe 130, which distributes compressed air from any suitable source of supply (not shown) to a plurality of ports 131, in the push board 126. The lower faces of the bottom flange 196, of the push board has grooves 132, terminating at the corners thereof, the purpose of which will be described hereinafter. The grooves or ports 131 and 132 are in communication with each other by means of conduits 197, in the push board.

Mounted on the lower face of the push board 126, by means of screws 133, are a plurality of push board pads 134, separated one from the other by means of transverse recesses 135, formed in the push board. These pads 134, are of such a size as to fit within the compartments 141, of the mold 5, with a slight amount of clearance, the recesses 135, are of sufficient depth and width to receive the mold partitions 137. The pads 134, are guided into the mold compartments 141, by means of guide plates 138 (see Figures 5 and 35), which are curved outwardly in a direction longitudinal to the mold 5, as at 142, and are beveled inwardly in a direction transverse to the mold as at 143, so as to be guided into the end extensions 139, of the mold. These guide plates 138, are secured, one each, to opposite ends of the top flange of the push board head by means of bolts 101.

The pusher carriages 55—55' previously referred to, and best illustrated in Figures 38, 39 and 40, comprise two longitudinal frame members 145, separated by spacing blocks 146 and 147, and connected together by means of bolts or the like fastenings 148, passing through the frame members and spacing blocks. Reduced portions or fingers 149, projecting forwardly from the frame members 145, are adapted to engage the pallet 8, and a cross bar 150, having reduced ends 151, is adapted to engage the mold 5. The relation between the fingers 149, and the cross bar 150, is such as to insure the longitudinal centering of the mold on the pallet. The frame members 145, of the pusher carriages are supported upon and secured to a pair of front and rear axles 152 and 152' as at 153. Mounted on the end of these axles are sleeves 154, upon which are ball bearing housings 155, which in turn support the wheels 156. These wheels 156, run along the members 57 and 59 of the transfer table 14. In order to preclude the possibility of the carriages being lifted off the transfer table 14, a guide member 158, is employed, comprising two L-shaped angle members 159, separated by the spacing block 147, and held in place by the rear axle 152' and the rearmost one of the two bolts 148. The horizontally disposed portion of the angle members 159, extends beneath the transfer tables on each side of the opening or slot 58, and in consequence prevent the pusher carriages from being accidentally lifted off the transfer tables. Pusher plates 160, secured to the rear ends of the pusher carriages by bolts 161, are adapted to be engaged by driving chains in a manner and for a purpose about to be described.

With reference to the right hand position of Figure 6 of the drawings, the pusher carriage 55, is actuated to move the pallet and mold thereon from the transfer table to the ledges 300, of the stripper, by means of the driving sprocket chain 162, which runs over the sprockets 163 and 164 mounted on the shafts 165 and 166. Secured to the chain 162, is a pusher lug 167, which engages the pusher plate 160, just mentioned, depending from the rear of the pusher carriage, when the shaft 165 is rotated in an anti-clockwise direction, thus causing the pusher carriage, pallet and mold to move along the transfer table towards the stripper. During this movement pallet and mold are guided in their travel by means of the angle iron guides 100, previously referred to. A pair of pawls 168' and 169' fixed to a stub shaft 170, are engaged by and stop the mold and pallet respectively when the mold and pallet have been pushed to the left Figures 3 and 6, into the stripper. In this position the pusher lug 167, on sprocket chain 162, disengages from the pusher plate 160, on the pusher carriage and revolves around the small sprocket 164. The pusher carriage 55 now returns to its normal position under the action of counterweight 171, and cable 172. The cable 172, passes over pulleys 173 and 174 in the frame F, and is connected at opposite ends to the counterweight and pusher carriage. The length of the sprocket chain and the speed of the drive is such that the pusher lug 167, makes one complete revolution every cycle of the machine, and is, in position to again advance the pusher carriage 55 by the time the latter has pushed a mold and pallet forward into the stripper and has been returned for a similar operation, and a new mold and pallet have been advanced onto the transfer table.

This action of course, takes place alternately from each side of the machine, there being shown in Figure 6, on the other side of the machine to that just described, a pusher carriage 55', drive sprocket 163', idler sprocket 165', cable 172' and counter weight 171', all similar in construction and operation to the corresponding described parts on the other side of the machine.

Figure 3:
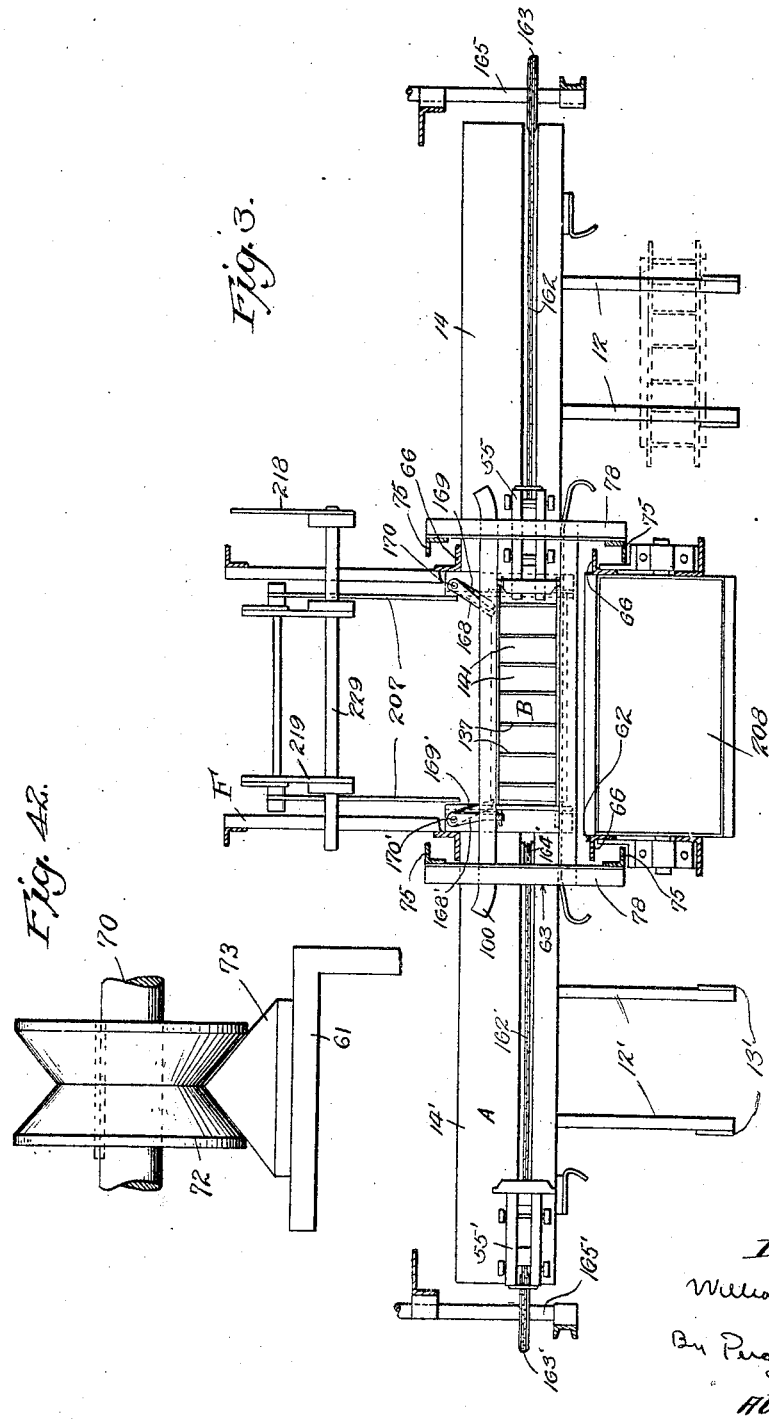
Figure 3 is a section on the line 3—3 of Figure 6.
Figure 4:
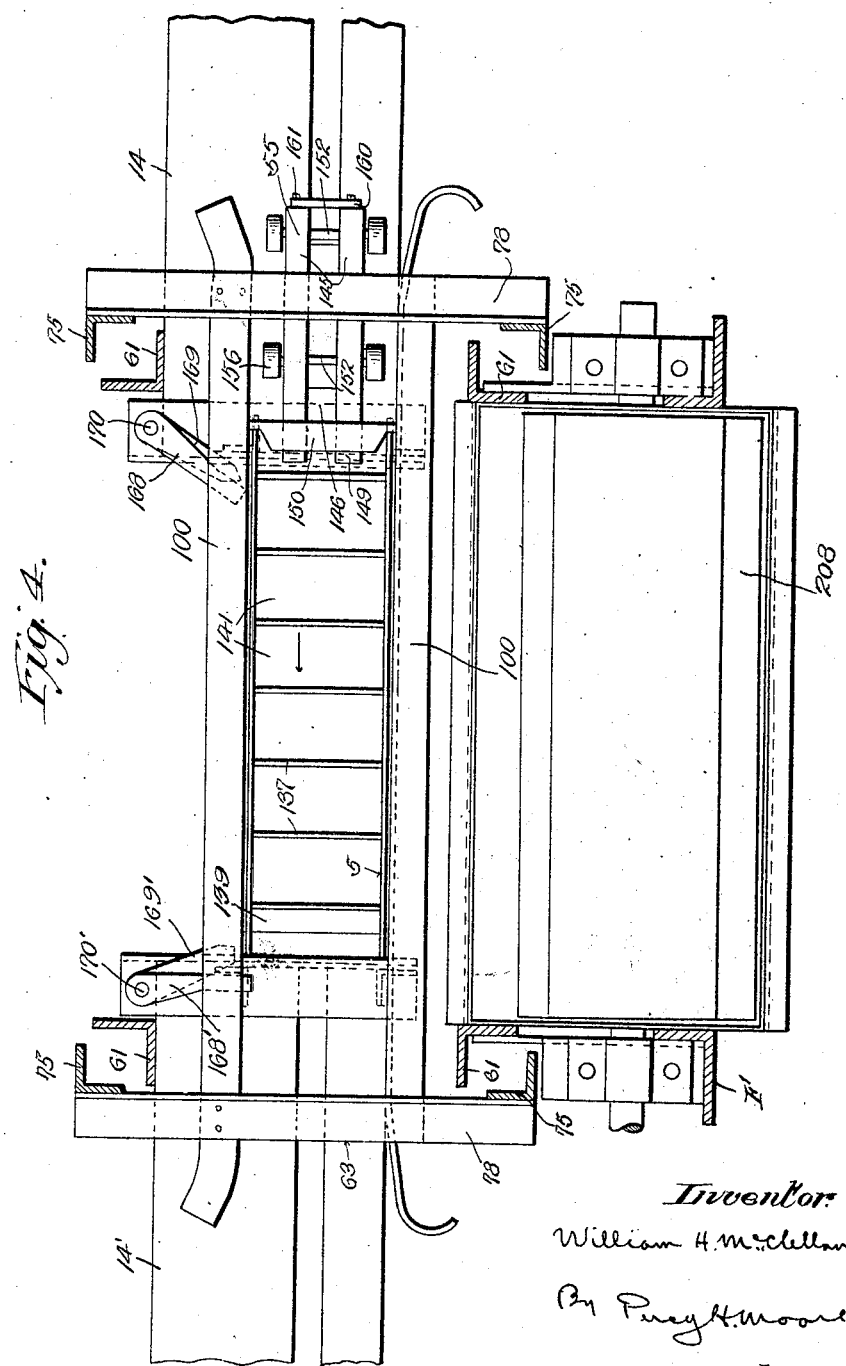
Figure 4 is an enlarged detail plan of the transfer track showing a mold and pallet engaging the mold and pallet stops.
Figure 17:
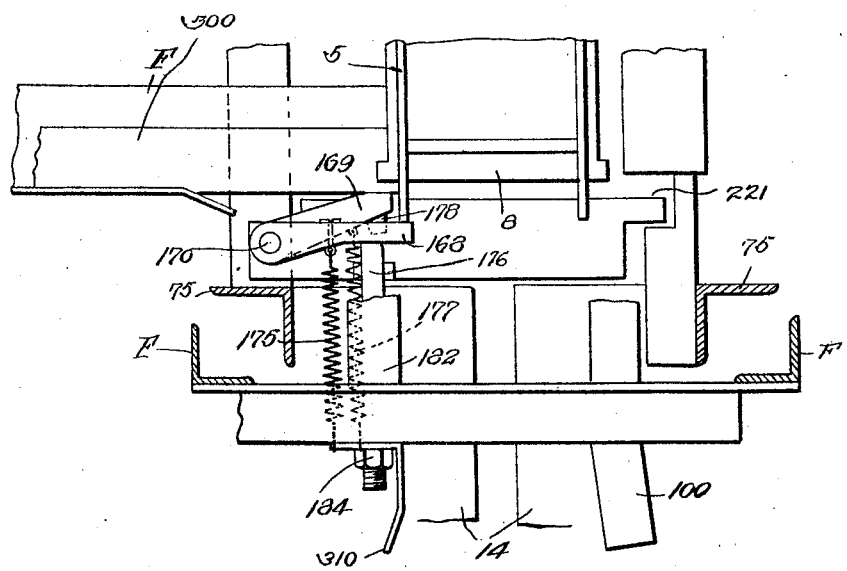
Figure 17 is a fragmentary plan view partly in section showing the mold and pallet stops and a portion of the transfer tracks.
Figure 18:
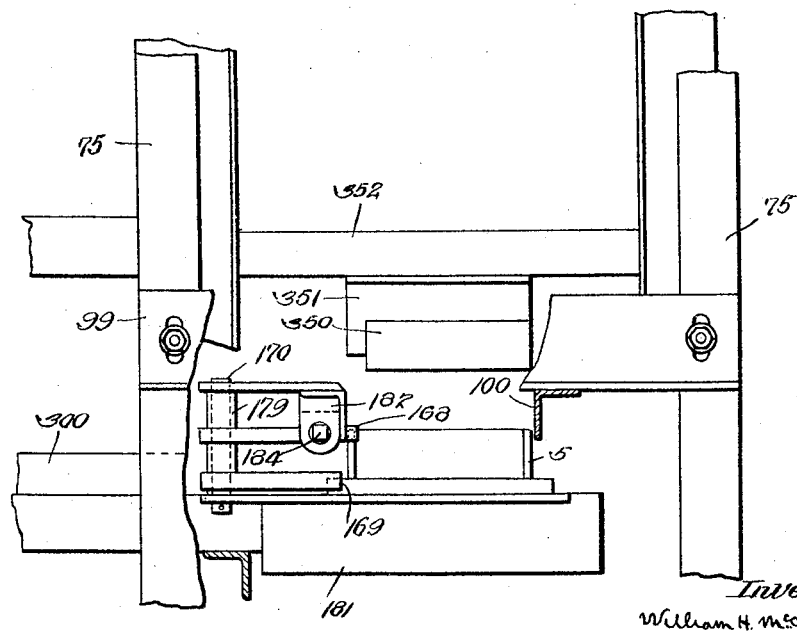
Figure 18 is an end view partly in section, showing the mold and pallet engaging the mold and pallet stops.
Figure 21:
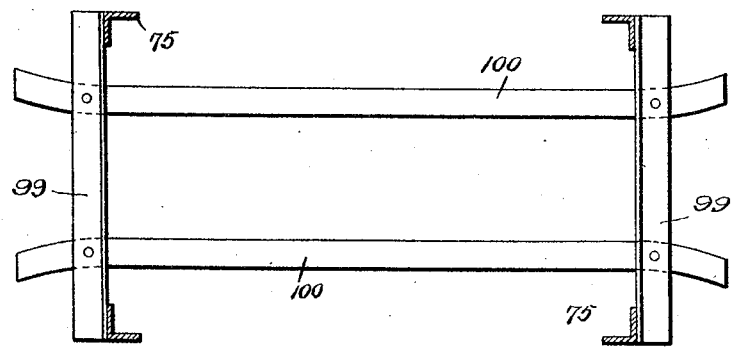
Figure 21 is a section on the line 21—21 of Figure 20.
Figure 24:
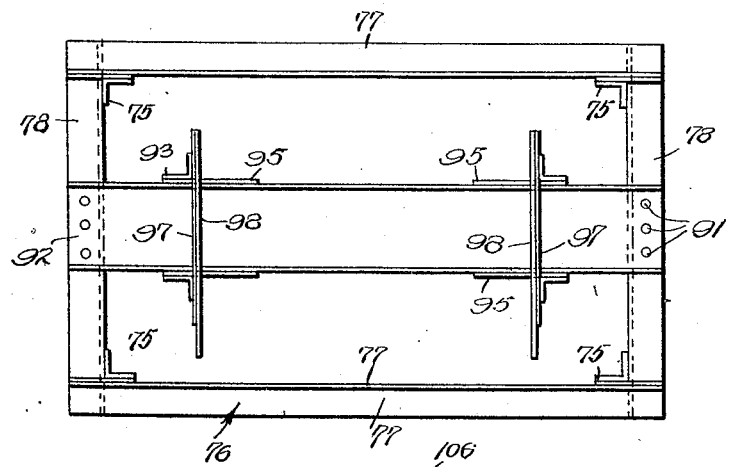
Figure 24 is a top plan of the mold engaging members of the mold lift cage.
Figure 28:
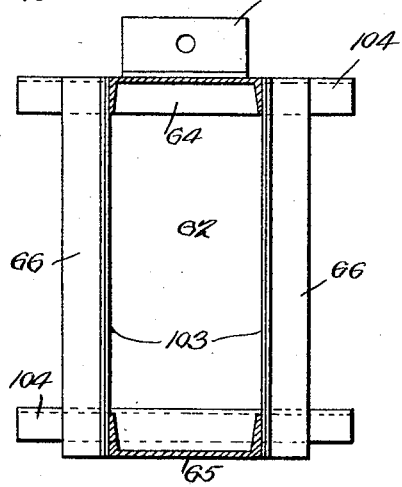
Figure 28 is a section on the line 28—28 of Figure 25.

During the movement of the pusher carriage 55, in its travel to the left in Figures 3 and 6, the mold and pallet engage and brush aside the mold and pallet pawls 168 and 169 respectively mounted on the stub shaft 170. Springs 175 return the pawl 168, to normal position against the stop 176, and spring 177, returns the pawl 169, to normal position against the stop 178. The shaft 170, is mounted in a sleeve 179, secured between the angle members 180 and 181. A U-shaped member 182, secured to the angle member 100, by rivets or the like 183, carries the stop bolt or member 176, adjustment of which may be made by means of the nut 184, for the purpose of adjusting the position of the pawl 168. When the mold and pallet reach the stripper, that is when they have been moved to the left to full line position, Figure 3, or B position Figure 6, the mold and pallet respectively engage the pawls 168' and 169', the movement of the mold and pallet continuing until the pawl 168' arrests further motion. The pusher carriage is then returned to its normal position and the stripping operation takes place. After the mold has been stripped from the brick in a manner presently described, the mold is moved into the sander 208, in a manner also described hereinafter. Another loaded mold together with a pallet is then advanced along the advance tracks 12' to position A on the transfer table 14', from where the mold and pallet are pushed past the pawls 168' and 169' on the shaft 170', and thence into the stripper, to B position, the movement continuing to the right Figure 3 until the pawl 168, is caused to engage the stop 176. This operation is just the reverse to that described in connection with the movement of the mold and pallet to the left in Figure 3, by the pusher carriage 55, and it will of course, be understood that the cycle of operation just described is repeated indefinitely.

Assuming that a pallet and mold with brick therein have been moved to B position Figure 6, where the pallet rests at its ends on the ledges 300, the push board cage 62, is now lowered to bring the push board pads 134, into contact with the brick. This is accomplished, as previously described by means of the cam 109, which engages the roller 115, on the walking beam 105, and causes the latter to rock on its pivot when the cam shaft 117, is rotated. Cam shaft 117 is driven thru gear 512 from gear 511 which is keyed to main drive shaft 510. When the push board pads come into engagement with the bricks in the mold, the mold lift cage 63, is then lifted, as also previously described, by means of cam 116, on cam shaft 117, engaging the roller 115, on the walking beam 113, and causes the latter to rock on its pivot in a similar manner to action of the walking beam 105. As the shaft 193 is connected to the brackets 82—82' on the mold lift cage, by means of connecting rods 111 and 111' and the walking beam being also connected to the shaft 193, by means of crank arms 112 and 114, it follows that movement of the walking beam 113, is communicated to the mold lift cage.

As the mold lift cage rises, the angle iron mold lift members or rails 98, engage the ends of the mold and raise the latter off the pallet until the lower surface of the mold is slightly higher than the top of the brick which together with the pallet remains stationary. During this operation the push board pads 134, remain in contact with the top of the bricks in the mold, but when the mold has been lifted clear of the pads, the push board 126 together with the pads 134, attached thereto start to rise. To prevent the possibility of the mold rising as the push boards are withdrawn, stop plate 350 is provided and is attached to angle iron 351 which is supported by angle iron 352 on post 61. When the air ports 131, in the top flanges of the push board reach the same elevation as that of the lower surface of the mold, compressed air is admitted to the ports 131, through the pipe 130, by means of a spring actuated valve 185. The valve lever 186, of the valve 185, is connected to a lever 187, depending from the frame F by means of a connecting rod 188. This lever 187, is engaged by a cam 189, on a shaft 190, and is moved to the right Figure 1, to open the valve 185, upon each rotation of the shaft 190. The air ports 131, direct the compressed air into the corners of the mold, and blow out any of the brick making materials or sand which may have a tendency to collect in the mold. The push board having withdrawn from the mold and the air turned off at the valve 185, by the action of cam 189, the push board continues to rise until the guide plates 138, are clear of the top surface of the mold. The mold and pallet with the brick thereon are then ejected from the stripper in a manner presently to be described.

Figure 2:
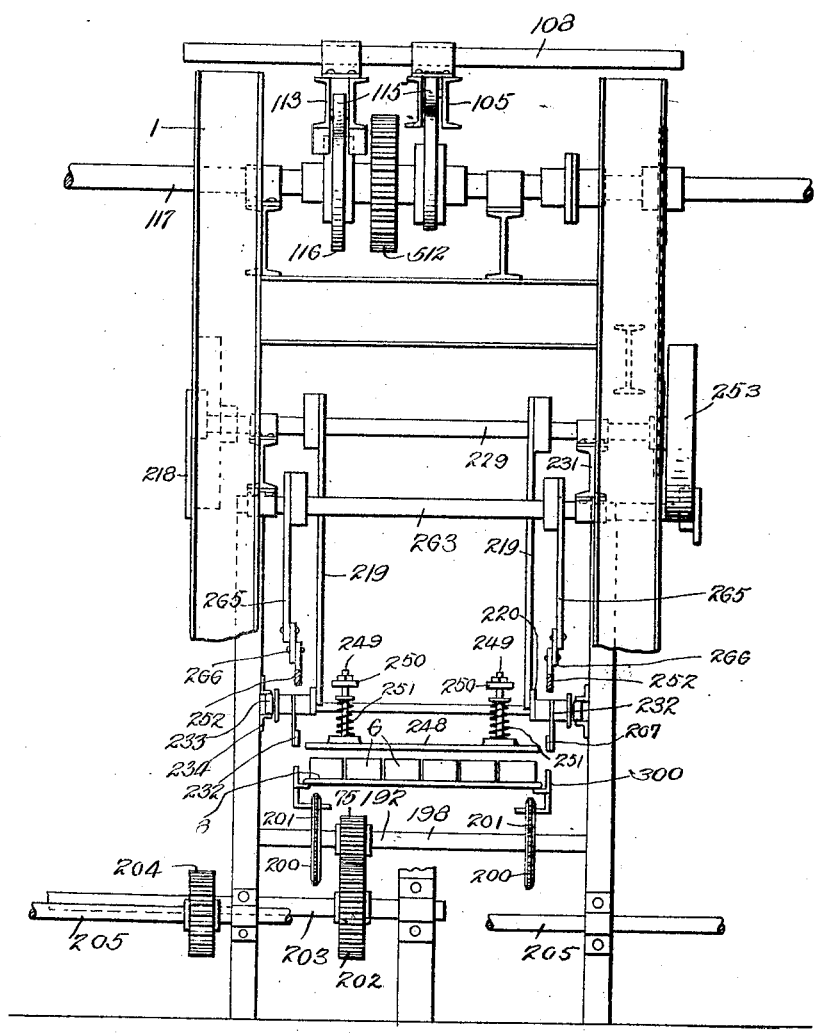
Figure 2 is a section on line 2—2 of Figure 1.

Mounted in the stripper frame, as best illustrated in Figures 1 and 2, are shafts 192 and 198, on which are secured sprockets 199 and 200 over which run a pair of sprocket chains 201. These chains are driven through intermittent gear 75, on the sprocket shaft 192, meshing with intermittent gear 202, on a shaft 203, in turn driven by a gear 204, on a shaft 205, the gear 204, meshing with a small gear 206, on the shaft 203. The chains 201 are provided at spaced intervals with lugs 506 which engage the pallet and drag it out of the stripper to make way for the next incoming pallet, when the sprocket chains 201, are actuated in an anti-clockwise direction.

At the same time that the pallet with brick thereon is being removed from the stripper, push arms 207, (see Figure 1), push the previously cleaned mold out of the stripper into the sander 208, described in my co-pending application Serial No. 755,941 filed December 15, 1924. The push arms 207, are driven by intermittent gear 209, on the shaft 190, meshing with gear 210, on a shaft 211, the gear 209 being driven by a sprocket chain 212, running over sprockets 213 and 214 mounted on the shafts 190 and 117 respectively. The shaft 211, has mounted thereon a crank disc 215, to which is secured a connecting rod 216, by means of a pin 217. This connecting rod 216, is connected to a crank arm 218, which in turn is fixedly connected to a shaft 229, journaled in brackets 230 supported on the beam 231, of the frame F. Arms 219 also fixed on the shaft 229 are connected to the pusher arm 207, by means of links 220 and brackets 232. The brackets 232, have heel members 233, which engage in the channel members 234, and guide and support the arms 207, in a horizontal position. Guides 550 are also provided for an obvious purpose.

After the mold has been pushed out of the stripper and into the sander 208, and the latter has been rotated to elevate the mold as described in my said co-pending application, the mold is pushed out of the sander in the following manner. Pusher arms 252, which are adapted to engage the mold, are reciprocated toward and away from the sander at predetermined intervals, by means of a crank disc 253, mounted on a shaft 254. The disc 253, is driven from the cam shaft 190, by a gear 255, on the shaft 190, meshing with a small gear 256, on a shaft 257, mounted on which shaft 257, is a large intermittent gear 258, in mesh with a small intermittent gear 259, on the crank disc shaft 254. Secured to the crank disc 253, by means of a pin 250, is a connecting rod 261, which is connected to an arm 262 in turn fixed to a shaft 263. This shaft 263, is journaled in brackets 264, secured to the beam 231, and secured to the shaft 263, is an arm 265, connected to the pusher arm 252, by means of a link 266. Consequently the pusher arm 252, will be caused to reciprocate by the rotation of the shaft 254.

In the event it is found desirable to compress the material from which the brick are made, while in the mold, weights or springs (not shown) are applied to the push board cage 62, either previous to or during the stripping operation. To preclude the possibility of excessive pressure working or bending the pallet during the stripping operation and in consequence distorting the brick, an anvil 221 (see Figures 5, 6 and 7) is provided, comprising a pad or plate, supported upon two adjusting screws or bolts 222. These bolts 222, are supported in channel beams 223, in turn supported by toggle arms 224 and 225, pivotally connected together by stub shafts 226. The arms 224, are pivotally connected to the ends of a shaft 227, secured between the beams 223, and the arms 225 are supported at their lower ends on the ends of the shaft 234, journaled in brackets 235.

The anvil 221, is adapted to rise sufficiently to contact with the underside of the sheet metal of which standard pallets used in the brick making industry are made. This action of the pedestal begins previous to the application of pressure to the brick by the push board cage and the anvil is lowered after the pressure on the brick has been relieved. The anvil is controlled by a cam 236, (see Figure 7) on shaft 237, supported in the upright 270 of the frame F. An arm 239, pivoted at one end to the uprights 270, as at 240, is connected at its opposite end to a connecting rod 241. This connecting rod has a bearing block 242, secured to its threaded end by means of nuts 243, through which block 242, one of the stub shafts 226, extends, a pin or the like, holding the parts in place. A coil spring 244, connected at one end to an adjusting screw 245, attached to the uprights 246, of the frame F, and connected at its opposite end to the connecting rod, normally tends to hold the arms 224 and 225 in alignment and thus keep the pedestal in elevated position. After the mold has been stripped from the brick and the pressure on the brick has been relieved, the pedestal is lowered against the tension of the spring 244, thus dropping the pallet back upon the ledges 300. This return movement takes place when one of the two smooth faces of the cam 236, engages the roller 245 on the arm 239, twice during each revolution of the cam shaft 237, or once during each operation of the stripper. The pedestal 221, is guided between the angle uprights 247 in its up and down movements, toward and away from the mold.

In the operation of stripping the mold, a slight fin is formed on the upper corners of the brick. This can be removed by a flat board pressed in contact with the surface of the brick. The method of accomplishing this is shown in Figures 1 and 2 wherein 248, is the bobbing board supported by two rods 249, which run through clearance holes in arms 250, fastened to push board cage 62.

Springs 251 serve to create the pressure necessary. In operation, as the push board cage descends during the stripper movement, the bobbing board also descends, coming in contact with the brick which has previously been ejected from the stripper. Bobbing board 248, then vises with push board, permitting chains 201 to again propel pallet away from the stripper.

From the foregoing it is believed that the operation of the invention will be understood but the same may be briefly described as follows:

The brick making machine (described in patent to Roy P. M. Davis, No. 1,498,619 dated June 24, 1924) delivers filled molds to rails 12 and to rails 12' alternately (see Figure 3). The stripper mechanism hereinbefore described automatically ejects the brick from these molds, delivering the brick on the pallet to a table from which they are loaded on a car, while the mold is returned to the brick making machine.

Assuming that a filled mold and its pallet is resting on the left hand pair of arms 12' (see Figure 3) the levers shown on Figure 9 advance the mold onto table 14' where it is transferred to the stripper, or B position, by means of the carriage 55' and chain 162' previously described. As the mold is pushed into the stripper it is guided by angle irons 100 until its longitudinal motion is arrested by means of pawl 168. At this time the ends of the mold are in proper position to receive the dowel plates 138 (see Figure 10). The lower ends of these dowel plates extend below the push boards 134 so that as the push boards descend under the action of cam 109 and walking beam 105, the push boards are registered with the compartments of the mold.

While the push boards are in contact with the brick in the mold, cage 63 then lifts the mold clear of the brick, after which push board cage 62 rises, withdrawing the push boards 134 and dowel plates 138 from the mold. During this last motion the compressed air valve 185 operates as previously described.

The mold is then pushed out of the stripper into the sander 208 by means of push arms 207, while the pallet with brick thereon is dragged forward to position under bobber 248 by means of chains 201 and subsequently advanced by the same means to the end of the table from which they are loaded onto the cars.

While one mold is undergoing the treatment just described another mold has been deposited on right hand rail 12 (Figure 3) then advanced on to table 14 and pushed by means of carriage 55 to a position ready to enter stripper as soon as cages 62 and 63 have been restored to their normal positions.

Having thus described my invention, what I claim as new and desire to secure by Letters Patent, is:

1. In a brick making machine, means for receiving a pallet with brick containing mold thereon, mechanical means for stripping the mold from the brick, means for advancing the pallet with brick containing mold thereon from said receiving means to said stripping means, and means actuated by the stripper for cleaning the mold.

2. In a brick making machine, means for receiving a pallet with brick containing mold thereon, mechanical means for stripping the mold from the brick, means for advancing the pallet with brick containing mold thereon from said receiving means to said stripping means, and means for automatically cleaning the mold after the mold is stripped from the brick.

3. In a brick making machine, means for receiving a pallet with brick containing mold thereon, mechanical means for stripping the mold from the brick, means for advancing the pallet with brick containing mold thereon from said receiving means to said stripping means, and means spring actuated in one direction for bracing the pallet during the stripping operation.

4. In a brick making machine, means for receiving pallets with brick containing molds thereon, a transfer table having a longitudinal opening therein, a stripper for stripping the molds from the brick, means for moving the loaded pallets from the receiving means to the transfer table, a carriage adapted to run on said table for pushing said loaded pallets from the table into the stripper, said carriage having a depending portion guided in said opening.

5. In a brick making machine, means for receiving pallets with brick containing molds thereon, a transfer table, a stripper for stripping the molds from the brick, pusher arms adapted to resiliently engage and push the loaded pallets from the receiving means to the transfer table, means for actuating the pusher arms, and means for moving the loaded pallets from the transfer table to the stripper.

6. In a brick making machine, means for receiving pallets with brick containing molds thereon, a transfer table, a stripper for separating the brick from the mold, means for transferring the loaded pallets from the receiving means to the transfer table, a pusher carriage on said table, an endless belt adapted to engage said carriage to cause said carriage to move said loaded pallets into the stripper, and weight actuated means for returning said carriage to normal position.

7. In a brick making machine, means for receiving pallets with brick containing molds thereon. a transfer table, a stripper for separating the brick from the mold, means for transferring the loaded pallets from the receiving means to the transfer table, a pusher carriage on said table, an endless belt adapted to engage said carriage to cause said carriage to move said loaded pallets into the stripper, and means for returning said carriage to normal position.

8. In a brick making machine, a table for receiving a pallet with brick containing mold thereon, a stripper frame having ledges, means for moving the pallet and loaded mold from the table onto said ledges, and means for lifting said mold away from said pallet and said brick.

9. In a brick making machine, means for supporting a pallet with a brick containing mold thereon, a pair of oppositely moving members arranged above and below said pallet and mold supporting means, means for actuating one of said members to press the brick against the pallet, and means for actuating the other of said members to separate the mold from the pallet and brick thereon.

10. In a brick making machine, a stripper comprising a frame having ledges, means for delivering a pallet with mold containing brick to said ledges, means for bracing the pallet and elevating the pallet with mold thereon from the ledges, and means for stripping the mold from the brick while in said elevated position.

11. In a brick making machine, a stripper comprising a frame having ledges, means for delivering a pallet with mold containing brick to said ledges, means for bracing the pallet and elevating the pallet with mold thereon from the ledges, means for stripping the mold from the brick while in said elevated position, tracks adjacent said frame, and means for delivering the pallet with brick thereon to said tracks.

12. In a brick making machine, a stripper comprising a frame having means for supporting a pallet with brick containing mold thereon, a pair of cages in said frame, means for actuating said cages in opposite directions, means for bracing the pallet and lifting the pallet and loaded mold off said supporting means, means on one of said cages for engaging the brick to press the brick to the pallet, and means on the other of said cages for engaging the mold and lifting the mold away from the pallet and brick thereon.

13. In a brick making machine, a stripper comprising a frame having means for supporting a pallet with brick containing mold thereon, a spring actuated reciprocating member in said frame for engaging and elevating the pallet and loaded mold off said supporting means, and a second reciprocating member operating in said frame for stripping said mold from the brick, and means for actuating said reciprocating members.

14. In a brick making machine, a stripper comprising a frame having ledges, a transfer table for receiving a pallet with mold containing brick thereon, means for transferring said pallet and loaded mold from the table to said ledges, guide rails in said frame for guiding the pallet and mold during said movement, and independent means for stopping the movement of said pallet and mold when said members have moved to predetermined position on said ledges.

15. In a brick making machine, a stripper comprising a frame having pallet and mold supporting means, means for delivering a pallet with brick containing mold to said supporting means, means for stripping the mold from the brick, means for ejecting the brick, and means actuated during the stripping operation for bobbing the brick previously ejected from the stripper.

16. In a brick making machine, a stripper comprising a frame having pallet and mold supports, means for delivering a pallet with brick containing mold to said supports, a push board cage and a mold lift cage in said frame, means for lifting the pallet and brick containing mold off said supports adapted to brace the pallet, means for lowering the push board cage in contact with the brick, means for elevating the mold lift cage, and means on the mold lift cage adapted to engage the mold and lift the mold from the brick.

17. In a brick making machine, a stripper comprising a frame having pallet and mold supporting means, means for delivering a pallet with brick containing mold to said supporting means, means for stripping the mold from the brick, means for ejecting the brick, means actuated during the stripping operation for bobbing the brick previously ejected from the stripper, and means for ejecting the brick from the stripper.

18. In a brick making machine, a stripper comprising a frame having pallet and mold supports, means for delivering a pallet with brick containing mold to said supports, a push board cage and a mold lift cage in said frame, means for lifting the pallet and brick containing mold off said supports adapted to brace the pallet, means for lowering the push board cage in contact with the brick, means for elevating the mold lift cage, means on the mold lift cage adapted to engage the mold and lift the mold from the brick, and automatic means for bobbing the brick previously ejected from the stripper.

19. In a brick making machine, a stripper comprising a frame having pallet and mold supports, means for delivering a pallet with brick containing mold to said supports, a push board cage and a mold lift cage in said frame, means for lifting the pallet and brick containing mold off said supports adapted to brace the pallet, means for lowering the push board cage in contact with the brick, means for elevating the mold lift cage, means on the mold lift cage adapted to engage the mold and lift the mold from the brick, and means carried by the push board cage for applying pressure to the brick previously ejected from the stripper.

20. In a brick making machine, a stripper comprising a frame, a push board cage in said frame, a mold lift cage in said frame, means for delivering a pallet with brick containing mold thereon to said stripper between said cages, means operating in said mold-lift cage for lifting the pallet and loaded mold, means for lowering the push board cage into contact with the brick in the mold to press the brick to the pallet and means for elevating the mold lift cage to cause said mold lift cage to contact with and strip the mold from the brick.

21. In a brick making machine, a frame, means in said frame for supporting a pallet with brick containing mold thereon, oppositely disposed reciprocating members in said frame, one of said members adapted to press the brick to the pallet and the other of said members adapted to lift the mold from the brick.

22. In a brick making machine, a frame, means in said frame for supporting a pallet with brick containing mold thereon, oppositely disposed reciprocating members in said frame, one of said members adapted to press the brick to the pallet and the other of said members adapted to lift the mold from the brick and means carried by one of said reciprocating members for cleaning the mold.

23. In a brick making machine, a frame having means for supporting a pallet with brick containing mold thereon, means in said frame for stripping the mold from the brick, means in said frame for holding the brick to the pallet during the stripping operation, and means for feeding air to said last mentioned means.

24. In a brick making machine, a frame having means for supporting a pallet with brick containing mold thereon, a push board cage for pressing the brick against the pallet, a mold lift cage adapted to strip the mold from the brick while the brick is held against the pallet by the push board cage, said push board cage comprising a push board and head therefor, formed with air ports, and means for feeding air to said ports.

25. In a brick making machine, a frame having means for supporting a pallet with sectional brick containing mold thereon, a push board cage having a push board thereon for pressing the brick against the pallet, means for registering the push board with the compartments in the mold, a mold lift cage adapted to strip the mold from the brick while the brick is held against the pallet by the push board.

In testimony whereof I affix my signature.

WILLIAM H. McCLELLAND.